United States Patent [19]
Bridwell et al.

[11] 3,815,697
[45] June 11, 1974

[54] STEERING CLUTCH AND BRAKE CONTROL SYSTEM

[75] Inventors: John W. Bridwell, Peoria; Robert Casey, Washington, both of Ill.

[73] Assignee: Caterpillar Tractor Co., Peoria, Ill.

[22] Filed: Sept. 1, 1972

[21] Appl. No.: 285,926

[52] U.S. Cl. ................... 180/6.2, 180/6.7, 192/4 A, 192/13 R
[51] Int. Cl. ............................................ B62d 11/00
[58] Field of Search .................. 192/13, 18 A, 4 A; 180/6.2, 6.7

[56] References Cited
UNITED STATES PATENTS
3,262,525 7/1966 Ehlke et al. ..................... 192/13 R
3,709,344 1/1973 Sieren ........................... 192/13 R X Primary Examiner—Evon C. Blunk
Assistant Examiner—Joseph E. Valenza
Attorney, Agent, or Firm—Phillips, Moore, Weissenberger, Lempio & Strabala

[57] ABSTRACT

A steering system for track-type vehicles wherein a foot pedal actuates a hydraulic valve to signal a hydraulic motor to disengage a steering clutch and wherein the same pedal, after actuating said valve, physically bears upon the valve housing to mechanically cause engagement of a corresponding steering brake means. The foot pedal is biased towards a normal rest position by means of two springs having different spring rates, such that initial movement of the pedal requires only light force whereas subsequent movement requires a greater force.

11 Claims, 3 Drawing Figures

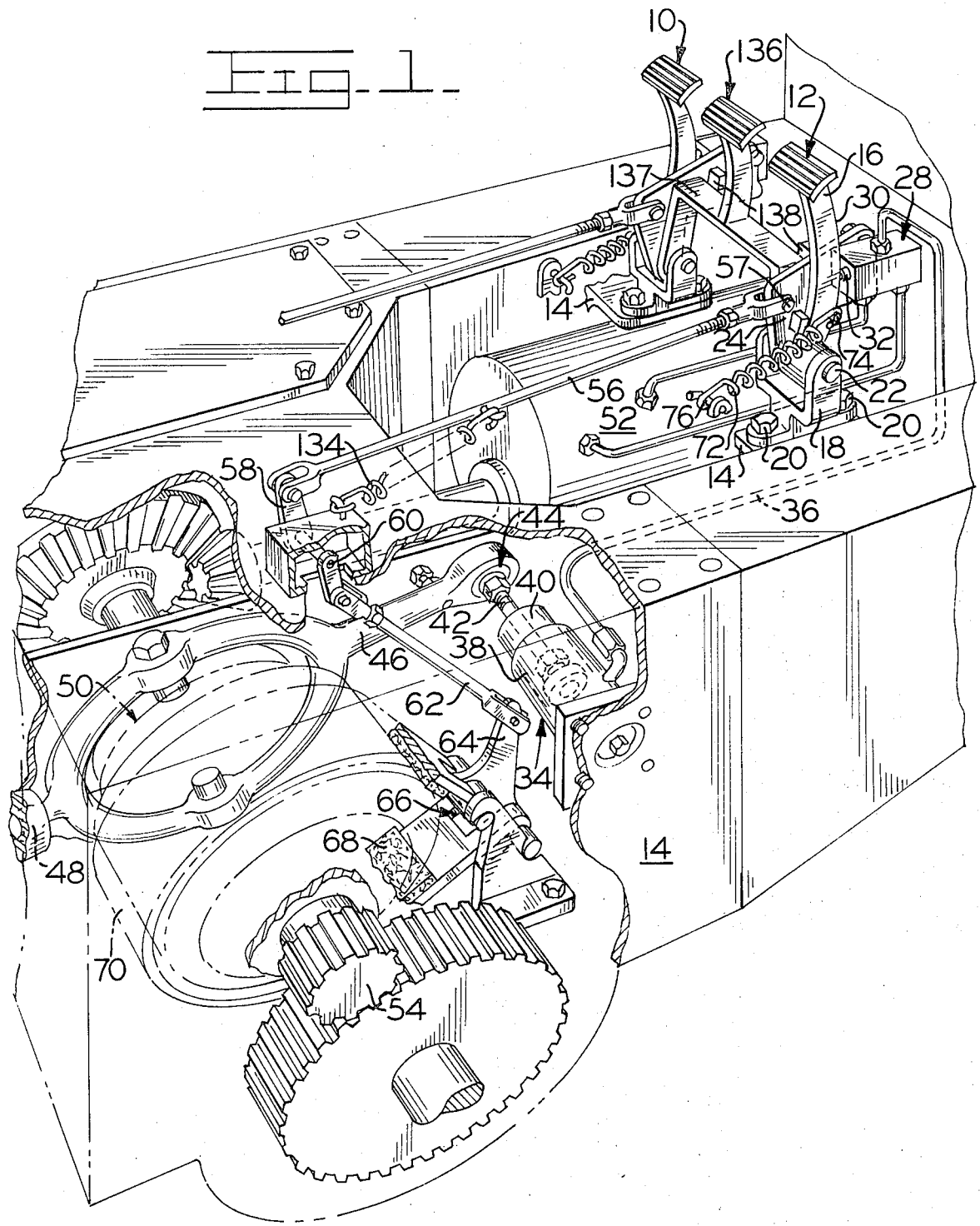

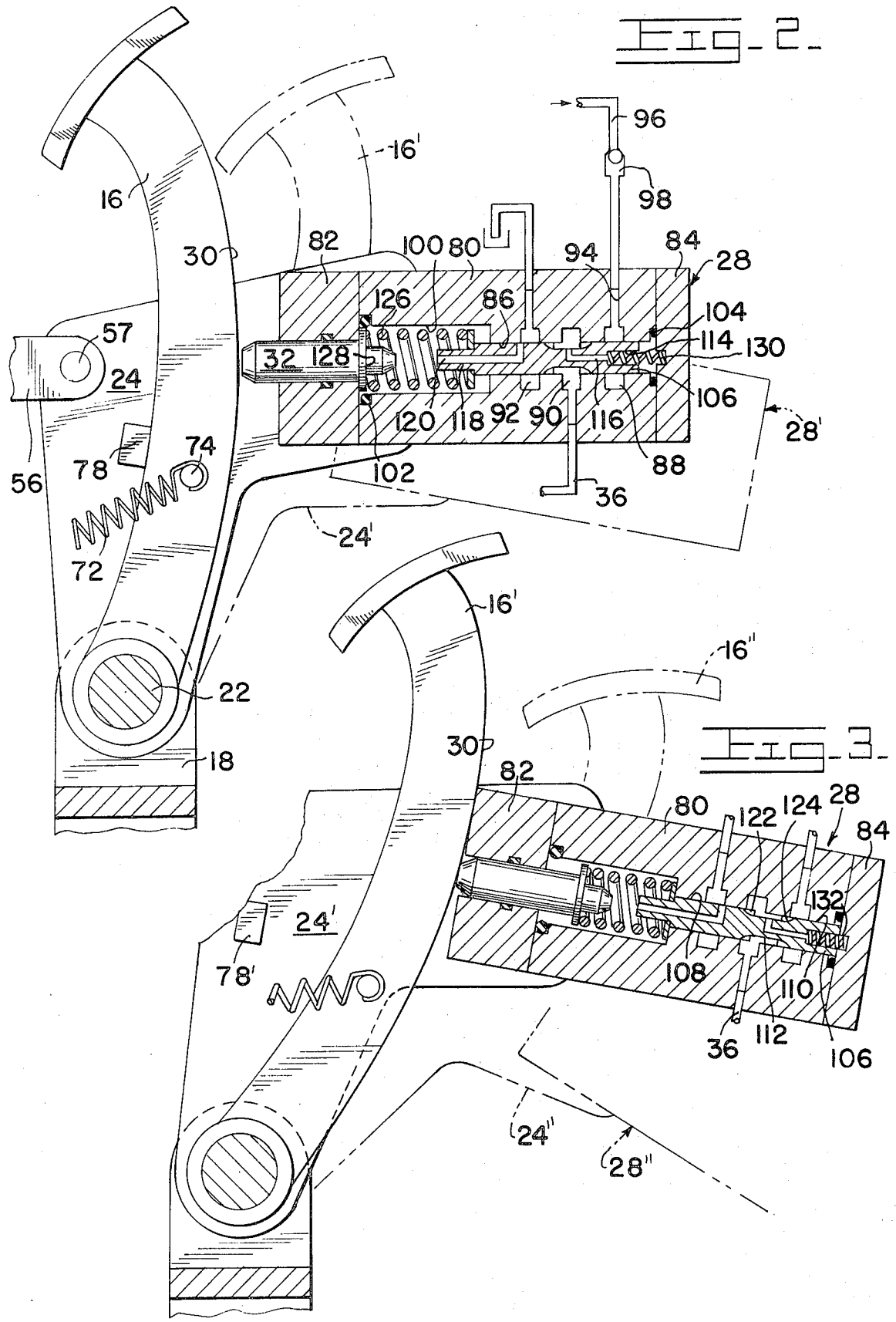

STEERING CLUTCH AND BRAKE CONTROL SYSTEM

BACKGROUND OF THE INVENTION

Steering of most track-type vehicles has traditionally been accomplished by varying the relative speeds of the respective tracks. Such a speed variance may be accomplished in several ways.

Some systems utilize a clutching arrangement whereby, when a turn is desired, power to one of the tracks is discontinued by means of the disengagement of a clutch while power to other of the tracks is maintained. Another system employs brakes alone to slow down or stop one of the tracks while allowing the other track to operate at normal speeds, thus causing a turn.

A still further system, the one most commonly employed today, provides separate, manually operated controls for each of the tracks wherein each control sequentially releases or disengages a steering clutch on one side of the vehicle and then applies a steering brake on the same side of the vehicle. Such sequential operation provides for either gradual steering which is achieved merely by disengagement of one of the steering clutches while allowing the other one to drive its track with full power or it provides more abrupt steering for close quarter maneuvering. This is achieved by rapid disengagement of the steering clutch and application of the steering brake on the same side of the vehicle.

While sequential controls may be operated by either hand levers or foot pedals, it is most desirable to steer track-type vehicles by means of foot controls so that the operator's hands will be free to manipulate attention-demanding controls for the various vehicle-mounted implements. An example of such pedal controls is shown in U.S. Pat. No. 3,262,525, to Ehlke et al., of common assignment herewith. Another example of a foot-pedal steering system is shown by U.S. Pat. No. 3,494,449 to Umeda, et al.

Complex hydromechanical systems have been developed to operate sequential clutch braking systems such as those described. Such systems are necessarily quite expensive because of their sophistication. Hydraulic valves and servos have been adopted for use in such systems and have included expensively fabricated concentric bores and spools which require precision fitting for effective operation and which often include large numbers of spool lands and annular passageways and connecting passages, the fabrication of which requires expensive machining.

It is typical in prior art system to provide for lost motion between the clutch controls and brake controls so as to positively assure proper sequencing thereof. Such lost motion systems are often expensive and require precision adjustment of linkages and the like. Under the adverse conditions often encountered in field use of the vehicles upon which these systems are utilized, a serious problem exists when, due to improper lost motion linkage adjustment and consequent imprecise sequencing, "fighting" occurs between the components wherein an engaging brake acts against an engaged clutch which is forced to slip. An attempt to obviate some of these problems through sequencing by more complex hydraulic circuitry is shown in U.S. Pat. No. 3,369,460 to Ehlke et al., of common assignment herewith.

Another problem often encountered in steering track-type vehicles, especially those of large dimensions, is to keep the operator-expended effort as low as possible while still providing positive action and return to normal condition of the heavy, necessarily durable elements of such systems. In addition to providing operator ease, steering systems for such track-type vehicles must include a provision for the emergency application of brakes in the event of a failure in the hydraulic system which normally operates the clutches so as to provide a fail-safe capability.

SUMMARY AND OBJECTS OF THE INVENTION

The present invention provides a simple and economically fabricated hydromechanical steering system for track-type vehicles which meets all of the above-mentioned demands without sacrifice in efficiency or in longevity of use.

An object of the present invention is to provide a manually-operated, pressure-reducing valve which, by means of an operator-actuated foot pedal, controls the disengagement of a steering clutch through a remotely disposed hydraulic motor while sequentially, through a reaction of the housing for such valve, taking up the slack in a mechanical brake linkage to permit smooth braking to occur subsequently to disengagement of the steering clutch.

Another object of this invention is to provide a foot pedal which initially operates a hydraulic valve to disengage a remotely disposed clutch, which valve includes a housing which is directly engaged by such foot pedal to prepare the brake linkage connected thereto for mechanically actuating the vehicle brakes.

Still another object of the invention is to provide a single foot pedal and crossbar mechanism which provides for fail-safe emergency application of the brakes of both tracks of a track-type vehicle upon failure of the hydraulic system in such vehicle.

Other objects and advantages of the present invention will become apparent upon reference to the accompanying drawings and following description.

BRIEF DESCRIPTION OF THE DRAWINGS

FIG. 1 is a partially cut away, isometric view of the instant steering control system for a track-type vehicle having two tracks;

FIG. 2 is an enlarged sectional elevation of the foot pedal clutch and brake control steering system of the instant invention showing the position of various elements when the steering clutch is engaged and the brake is disengaged and showing, in phantom, the position of the elements when the steering clutch is disengaged but before the brake is applied; and FIG. 3 is a view similar to FIG. 2 but showing the position of the elements when the steering clutch is disengaged but before the brake is applied and showing, in phantom, when the steering clutch is disengaged and the steering brake applied.

DETAILED DESCRIPTION

With reference to FIG. 1 in the drawings, left and right-hand, pedal-actuated steering clutch and brake control systems are respectively shown generally at 10 and 12. Such pedal control systems are shown pivotally connected to the main frame 14 of a track-type vehicle at 22. Inasmuch as the left and right-hand control systems for the instant track-type vehicle are essentially identical, only the right-hand control system will be described hereinafter; it being understood that the system for the left-hand side is the same.

The right-hand pedal control system 12 comprises a foot pedal 16 which is pivotally mounted upon a yoke member 18 which is in turn removably secured to the main frame 14 by a plurality of bolts 20. The yoke 16 contains a transversely and horizontally disposed pivot pin 22 upon which the foot pedal 16 is mounted. A floating, upright lever member 24 is also mounted upon the pivot pin 22 between the furcations of the yoke 18 and inwardly of the foot pedal 16. The lever member 24 fixedly supports a hydraulic fluid control valve shown generally at 28 on a forward portion thereof.

With further reference to FIGS. 2 and 3, wherein an enlarged view of the apparatus is illustrated, it will be noted that a face portion 30 of the foot pedal 16 directly engages a stem portion 32 of the hydraulic valve 28 to control the initial disposition of such stem portion. As will be explained more fully hereinafter, it is the position of such stem portion 32 which determines whether or not a control signal will be sent through the control valve 28 and at what pressure level to provide for disengagement of the right-hand steering clutch.

Disengagement of such clutch is provided by a remotely disposed fluid motor 34, which may be a simple hydraulic jack, which is supplied with hydraulic fluid under pressure through a conduit 36 leading from the valve 28. Such fluid motor 34 is provided with a cylinder 38 which is removably secured to the main frame 14 and a piston 40 which is disposed within the cylinder and which is inwardly extendible with increasing pressure in the conduit 36. Such inward movement of the piston 40 causes a rod 42 to act against a ball joint shown generally at 44 to cause rockable movement of an upright yoke member 46 around a ball joint 48 which is associated with and fixed to the main frame 14. Inward movement of the forward portion of the yoke member 46, as shown in FIG. 1, causes a steering clutch, which could be conventional construction, shown in phantom at 50, to be disengaged and to discontinue power transmission from the transmission gearing 52 to an output gear 54 which leads to the final drive (not shown) for the track-type vehicle.

When the foot pedal 16 is depressed, it acts through the plunger 32 to first condition the fluid control valve 28 to supply fluid at various pressures for disengagement of the clutch 50. When depressed, the foot pedal also acts through the housing 80 of the control valve 28 to move the floating lever member 24 in a clockwise direction about the pivot pin 22, which movement causes a brake link 56, which is connected to the lever member at a pivot point 57, to be urged rightwardly as shown in FIG. 1. Such movement of the brake link 56 causes clockwise rotation of a bell crank 58 which is oscillatingly mounted with respect to the main frame 14 by means of a pivot pin 60. Such oscillation of the bell crank 58 causes upward movement of the brake rod 62 with consequent counterclockwise movement of an actuating lever 64 to cause a toggle linkage system, shown generally at 66, to engage a brake band 68 on a drum 70 which drum is integrally secured to the output gear 54. The brake band and drum areas, shown in phantom, may be of conventional construction.

The sequential operation of the fluid control valve 28 to primarily establish a clutch disengagement fluid signal in the conduit 36 and to secondarily cause rightward mechanical movement of the brake link 56 so as to engage the brakes may best be described with reference to FIGS. 2 and 3.

The foot pedal 16 is shown initially in a condition of rest wherein a relatively light spring 72, connected between the fixed portion of the vehicle and the foot pedal at 76 and 74, respectively, biases the pedal in a counterclockwise direction to cause disposition thereof against a stop means 78 which stop means is integrally connected to the lever member 24. Such disposition of a pedal upon the stop means causes the face portion 30 to be spaced slightly away from the valve stem portion 32 when the pedal is in rest position.

The control valve 28 consists more particularly of a valve housing 80 which is removably secured by suitable means to the lever member 24 and which has a pair of end cover members 82 and 84 attached thereto. The housing 80 includes a spool portion receiving bore 86, an inlet annulus 88, and an outlet annulus 90. A drain annulus 92 communicates with the outlet annulus in certain dispositions of the valve spool.

A fluid inlet passageway 94 connects the inlet annulus 88 with a fluid pressure source 96 which is maintained at a suitably high pressure, i.e., approximately 300 psi by means of suitable pressure-maintenance valving (not shown). A one-way check valve 98 is disposed intermediate the source 96 in the passage 94 so as to prevent fluid pressure fluctuation in the passage 94 and to substantially maintain the pressure which is established therein in the event of a pressure drop in the source 96 upstream of the valve 98. Such a pressure drop might occur on a transient basis during periods of peak power demands such as when a gear shift is made in the transmission of the vehicle upon which the instant steering system is utilized. The housing member 80 has an enlarged bore 100 and two end counterbores adapted to receive seal members 102 and 104 which sealingly engage the end covers 82 and 84.

The spool 106 is of the pressure-reducing type, being provided with central passageways and metering grooves. The spool is reciprocally disposed within the bore 86 and is provided with a pair of lands 108 and 110 as well as an intermediate neck portion 112. The right-hand end of the spool includes a spring-receiving cavity portion 114 and an internal passageway 116 which communicates therewith and with the neck portion 112. The left-hand end of the spool includes a stepped diameter portion 118 and an internal passageway 120 which is outwardly associated with the land 108 for fluid release to the drain annulus 92. The spool further includes a plurality of pressure-relieving metering slots or grooves 122 intermediate the neck 112 and the land 108. A plurality of pressure-regulating metering slots 124 are provided intermediate the neck and the land portion 110. In all but fully open and fully closed positions of the spool 106, these metering grooves regulate the pressure of the fluid passing through valve 28.

A spring 126 is disposed between the stepped diameter 118 of the spool and a flanged end portion 128 of the stem 32 and is contained within the bore 100. Another spring 130 is contained within the cavity 114 and the counterbore 132 in the end cover 84.

OPERATION

Depression of the pedal 16 causes rotation of the portion 30 thereof against the stem 32 so as to cause the spring 126 to bias the pressure-reducing valve spool 106 rightwardly. The metering slots or grooves 122 are cut off from communication with the drain annulus 92 and subsequently the metering slots 124 are opened, to some degree, to communicate pressure fluid from the inlet annulus 88 to the outlet annulus 90 to provide a signal in the control conduit 36 which leads to the fluid motor 34. Rightward movement of the pedal 16 causes loading of the spring 126 which loading is opposed by the leftward biasing of the spring 130 as well as pressure in the annulus 90 which acts through passageway 116 on the right-hand end of the spool 106. A balanced spool metering condition is generally achieved during operation of the system with consequent proportionally substantially low pedal effort feedback to the operator.

The clutch 50 is essentially disengaged by the time the pedal 16 reaches the condition shown in phantom at 16'. It should be noted that the control valve 28 and the floating member 24, in this orientation, have moved a lesser angular distance to a phantom condition shown at 28' and 24', respectively.

In FIG. 3 is shown the disposition of the elements when the clutch is disengaged and also where the slack in the manually operated brake linkage system is completely taken up so that the brake is conditioned to operate. Initially, a low force, i.e., approximately 20 pounds of force exerted upon the pedal 16, would result in the application of approximately 150 psi metered through the valve 28 to the fluid motor 34 to permit possible clutch slippage for fine control of the vehicle. Further depression of the pedal 16 to the position shown at 16' would complete disengagement of the clutch and subsequently allow engagement of the brake band 68, through a toggle linkage 66, on the drum 70. When the pedal is in the position 16', the spool 106 is displaced rightwardly so that it abuts the inner portion of the end cover 84. At substantially this point, the face portion 30 of the foot pedal makes contact with the other end cover 82 of the valve housing and allows the transmission of higher loads directly from the housing 80 to the floating lever member 24 with consequent movement of the brake linkage 56.

From this point on, the operator experiences a more steeply increasing pedal effort by virtue of the control system acting against the heavier loading of the brake return spring 134 which is intermediate the linkage 56 and the frame 14 as shown in FIG. 1. For example, approximately 40 pounds of force on the pedal 16 would result in a substantially full braking and a maximum 300 psi control signal to the fluid motor 34 for clutch actuation. As the operator relieves the load on the pedal 16, the brake is progressively disengaged and then the clutch sequentially reengaged in the reverse manner through the action of the brake linkage return spring 134 and the conventional engaging action of a plurality of springs (not shown) within the clutch 50. Such action rocks the yoke 46 outwardly and restores the piston 40 to its rest condition ejecting fluid from the motor 34 through the control valve drain passageway. It will be noted that with the instant system, even if a hydraulic failure occurred and the pressure source 96 became unavailable to supply clutch disengaging pressure, the pedal 16 could still act directly through the end cover 82 and the housing 80 to apply a force to the mechanical brake linkage for emergency application of the brakes.

In order to provide a means for simultaneously engaging both brakes of the track vehicle in such emergency conditions, a third pedal 136 and subsidiary apparatus shown in FIG. 1 is provided. As shown, the pedal 136 is mounted upon a crossbar 137 or U-shaped member which is pivotally connected across the yokes 18 and which include two stop members 138 which respectively engage the inner portions of the floating lever members 24. Application of force to the pedal 136 causes the simultaneous application of force to the right and left-hand floating lever members 24 to cause simultaneous mechanical actuation of the track brakes. This simultaneous actuation system for the brakes, per se, is shown in greater detail in the above-mentioned U.S. Pat. No. 3,262,525, to Ehlke et al.

In view of the foregoing, it is readily apparent that the structure of the present invention provides an improved steering system for track-type vehicles which is of simple construction and which is economically fabricated. It has few moving parts and does not require critical adjustments or prohibitively expensive sealing means.

While the invention has been described and shown with particular reference to the preferred embodiments, it will be apparent that variations are possible which would fall within the spirit of the present invention, which invention is not intended to be limited, except by the scope of the appended claims.

We claim:

1. In a vehicle having a plurality of tracks and vehicle frame means, a steering control system comprising; a source of fluid under pressure, clutch means for at least one track of said vehicle, brake means for said track, valve means for selectively connecting said source of fluid to said clutch means to actuate said clutch means for disengagement thereof, control members means movable in a first direction for actuating said valve means and in a second direction for rendering said valve means inoperative to connect said source with said clutch means, mechanical linkage means connected to said control member means and said brake means, said control member means also operative for engaging said brake means, said control member means including a first member upon which said valve means is mounted and a second member movable relative to said first member sequentially to engage and actuate said valve means to connect said source to said clutch means and then to engage said brake means upon continuation of movement thereof.

2. A steering clutch and brake control system, for a track-type vehicle having a driven track on each side thereof and having normally engaged track clutch means, and normally disengaged brake means, comprising; a source of fluid under pressure, valve means for proportionately communicating said source of fluid to said clutch means for disengagement thereof, said valve means including a housing with a spool disposed therein, mechanical linkage means for engaging said brake means and for mountably supporting said valve means housing, and manually operated control means movable in a first direction for initially engaging and actuating said valve means to disengage said clutch means and for preparing said mechanical linkage means for responsive braking and for directly contacting said housing and moving said housing to thereafter act directly upon said mechanical linkage means to mechanically actuate said brake means.

3. The invention of claim 1 wherein said second member is a foot pedal pivotally mounted upon said vehicle frame means about a common axis with said first member, first stop means mounted upon said first member for engaging said foot pedal and first spring means connected between said vehicle frame means and said pedal for biasing said foot pedal toward engagement with said first stop means.

4. The invention of claim 3 wherein said valve means includes a pressure reducing valve having means for varying the pressure of fluid passing therethrough and having a housing mounted upon and fixed with respect to said first member, said valve having a stem portion which is adapted to engage said foot pedal.

5. The invention of claim 4 wherein said valve means further include a spool member having land portions thereon for selectively blocking or permitting fluid to flow between said source and said clutch means.

6. The invention of claim 5 wherein said foot pedal is actuateable in said first direction to first move said stem portion toward said spool member to cause said spool member to permit the flow of fluid to said clutch means and secondly to engage a portion of said valve housing to move said housing and said first member to actuate said brake means.

7. The invention of claim 6 further including second spring means connected between said mechanical linkage means and said vehicle frame means for biasing said brake means toward a disengaged position, said second spring means having a greater spring rate than said first spring means such that the force required to move said foot pedal to actuate said spool member to disengage said clutch means is less than the force required to continue to move said foot pedal to engage said valve housing and to engage said brake means.

8. The invention of claim 6 wherein said vehicle has a track mounted upon each of two sides of said frame means and wherein separate brake means, clutch means, valve means, control member means, and mechanical linkage means are provided for each said track.

9. The invention of claim 8 wherein a third foot pedal means is provided separately from said foot pedals for each respective track and wherein second and third stop means are provided upon each respective valve housing carrying member for each respective track, there being one such stop means upon each said member.

10. The invention of claim 9 wherein said third pedal means include means for simultaneously engaging said second and third stop means for simultaneously moving each of said housing carrying members to engage the brake means for each track.

11. The invention of claim 1 further including hydraulic motor means for actuating said clutch means and conduit means for communicating hydraulic fluid from said valve means to said motor means.

* * * * *